United States Patent [19]

Payne

[11] Patent Number: 5,274,888
[45] Date of Patent: Jan. 4, 1994

[54] ADJUSTABLE U-BOLT TYPE PIPE CLAMP

[75] Inventor: Wayne A. Payne, Crawfordville, Fla.

[73] Assignee: GTO, Inc., Tallahassee, Fla.

[21] Appl. No.: 48,453

[22] Filed: Apr. 5, 1993

[51] Int. Cl.[5] .............................................. F16L 3/00
[52] U.S. Cl. ........................................ 24/277; 24/455; 248/74.1; 285/382.2
[58] Field of Search ...................... 24/277; 278/279; 455/20; 248/74.1, 219.4, 230, 539; 285/420, 382.2

[56] References Cited

U.S. PATENT DOCUMENTS

| | | | |
|---|---|---|---|
| 2,993,254 | 7/1961 | Larison | 24/277 |
| 3,409,259 | 11/1968 | Cross | 248/230 |
| 4,262,943 | 4/1981 | Armstrong | 24/277 |
| 4,500,064 | 2/1985 | Calabro | 248/539 |
| 4,506,418 | 3/1985 | Viola et al. | 24/277 |

Primary Examiner—Victor N. Sakran
Attorney, Agent, or Firm—Macdonald J. Wiggins

[57] ABSTRACT

A saddle type pipe clamp that is adjustable to a wide range of pipe sizes includes a saddle portion formed by a pair of complementary saddle elements of channel stock. Each saddle portion includes curved clamping surfaces, and a bolt hole and slot in the closed edge. An elongate threaded rod is provided which is manually bent around a pipe to form a U-bolt. The saddle elements are adjusted to fit the U-bolt, and installed with washers and nuts. The ends of the U-bolt may be trimmed after installation.

5 Claims, 1 Drawing Sheet

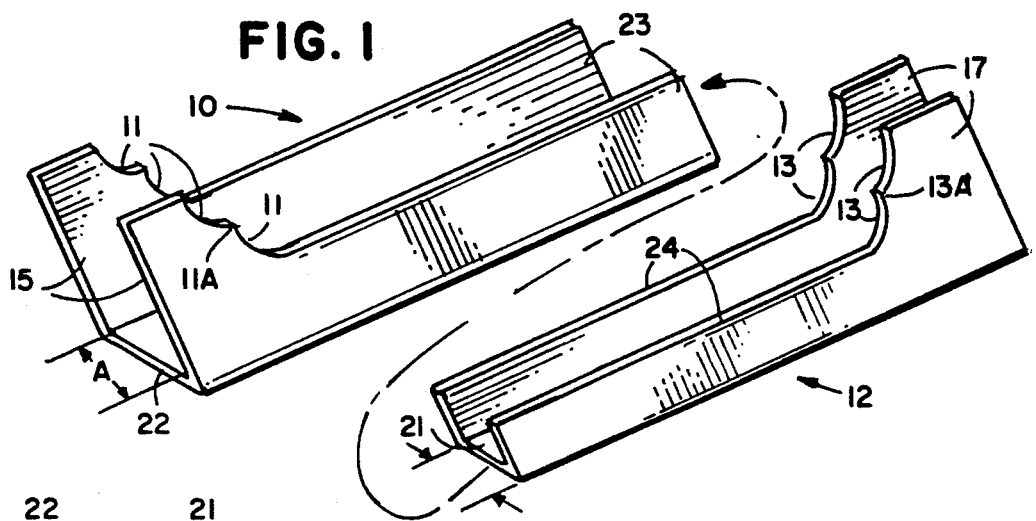
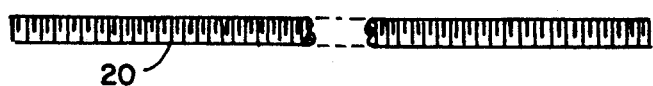
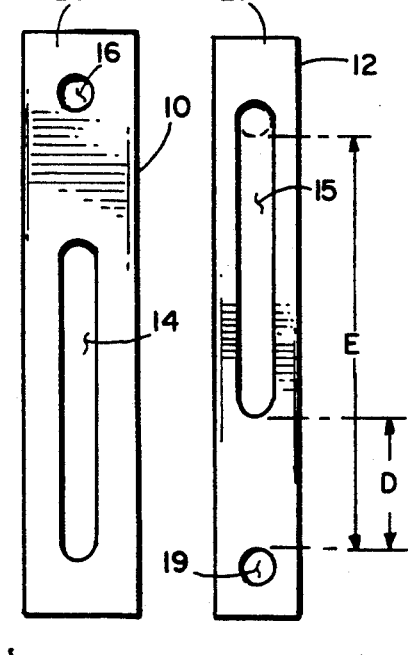
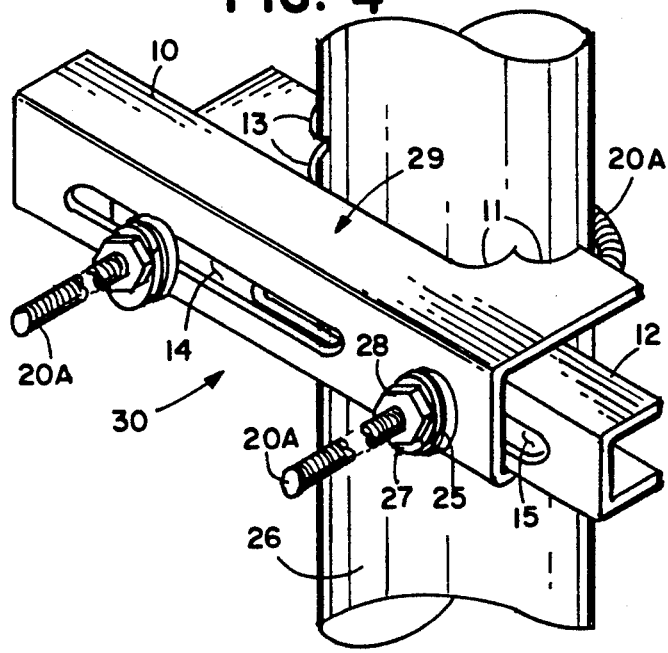

ADJUSTABLE U-BOLT TYPE PIPE CLAMP

BACKGROUND OF THE INVENTION

1. Field of the Invention

The invention relates to saddle-type clamps, and more particularly to a clamp that can be adjusted to fit various diameter pipes.

2. Description of the Prior Art

In fastening various devices to pipes, posts, and other cylindrical elements, it is common to utilize a clamp having a U-bolt to match the pipe diameter, and a saddle having an arcuate portion matching the pipe diameter disposed on the legs of the U-bolt and clamped with nuts and washers. Various types of articles may then be attached to the pipe by the extending ends of the U-bolt. A separate clamp must be provided for each diameter pipe, requiring the workman to stock a large inventory of clamp sizes. Otherwise, extra time and expense is experienced if an unexpected size pipe is encountered on a job.

There have been some attempts in the prior art to minimize this problem. Viola et, U.S. Pat. No. 4,506,418 discloses a muffler clamp having a U-bolt with serrations along the inner surface of the "U". This permits the legs to be spread over a small range to accommodate a very limited range of muffler pipes. U.S. Pat. No. 2,993,254 to Larson teaches a scaffolding clamp using straight clamp elements with slots instead of bolt holes. This design provides limited clamping surfaces. Arcuate shims are provided in U.S. Pat. 4,500,064 to Calabro for use with a standard U-bolt type clamp.

The prior art does not provide a clamp having a substantial range of adjustment. Thus, a need exists for a simple saddle-type clamp that can be formed on site to a wide range of pipe diameters, while maintaining a large clamping area.

SUMMARY OF THE INVENTION

The invention is a saddle type pipe clamp that is adjustable to a wide range of pipe sizes while maintaining a substantial clamping area in combination with a U-bolt formed from a threaded rod. A saddle portion of the clamp is provided by a pair of complementary saddle elements formed from channel stock. The sides of each of the saddle elements include arcuate extensions at one end thereof having curved clamping surfaces. The closed edge of each of the channels has a bolt hole at a first end adjacent the arcuate extensions, and a slot extending from adjacent the bolt hole toward the other end.

One of the saddle elements has an outside channel width slightly smaller than the inside width of the other saddle element channel to provide a sliding fit therewith. When the two saddle elements are assembled to form the clamp assembly, the element ends having extensions are located at opposite ends of the saddle assembly, thereby forming an essentially arcuate surface for gripping a pipe. As will be apparent, the saddle elements may be adjusted to contact opposing sides of a pipe.

An elongate threaded rod is provided, which may be standard threaded stock. The length of the rod is selected in accordance with the range of adjustment for pipe sizes of the clamp desired. The diameter of the rod matches the bolt holes and slot widths of the saddle elements.

To install the clamp of the invention, the threaded rod is bent to a U-shape, using the pipe to which the clamp is to be attached as a guide. A first saddle element is placed into the second saddle element with the bolt hole aligned with the slot in the second saddle element. The saddle elements are adjusted to align the two bolt holes with the legs of the U-bolt formed from the threaded bar and installed thereon. Washers and nuts are installed on the legs of the U-bolt. Extra lengths of the U-bolt legs may be trimmed in accordance with the space required for mounting of desired elements thereto.

It is therefore a principal object of the invention to provide an adjustable saddle-type U-bolt clamp to be usable with a wide range of pipe diameters.

It is another object of the invention to provide a saddle-type U-bolt clamp adjustable to fit a wide range of pipe sizes to therefore minimize the inventory of clamps required.

It is yet another object of the invention to provide a universal U-bolt type clamp for use with pipes, columns, posts, and the like of non-standard diameters.

These, and other objects and advantages of the invention will become apparent from the detailed description thereof when read in conjunction with the drawings.

BRIEF DESCRIPTION OF THE DRAWINGS

FIG. 1 is a perspective view of first and second saddle elements of the invention;

FIG. 2 is a bottom view of the saddle elements of FIG. 1;

FIG. 3 is a side view of a threaded rod utilized in the invention; an

FIG. 4 is a perspective view of the invention as installed on a typical pipe or post.

DETAILED DESCRIPTION OF THE PREFERRED EMBODIMENT

Referring to FIG. 1 and FIG. 2, the saddle elements for the adjustable saddle assembly of the U-bolt clamp of the invention is show. In FIG. 1, a perspective view of a first saddle element 12, and a second saddle element 10 are shown. First saddle element 12 is formed from sheet metal or the like to provide a channel having sides 24 and a closed edge 21. Each side 24 includes an extension 17 at a first end. Each extension 17 has one or more arcuate edges 13, the edges forming sharp teeth-like projections 13A extending therefrom.

Second saddle element 10 is formed from sheet metal or the like to form a second channel having sides 23 and an outer edge 22. Inner width A of second saddle element 10 is slightly greater than outer width B of saddle element 12 to permit saddle element 12 to fit within walls 23 of saddle element 10. Each wall 23 of second saddle element 10 includes a pair of extensions 15 at a first end. Extensions 15 each have one or more arcuate edges 11, identical to edges 13 of first saddle element 12, providing projections 11A.

Turning now to FIG. 2, the outer or closed edges 21 and 22 of saddle elements 10 and 12 are shown in plan view. A bolt hole 19 is provided in outer edge 21 adjacent the first end of saddle element 12. A slot 15 is provided in outer edge 21 having one end thereof spaced from hole 19 a distance D. The width of slot 15 is the same as the diameter of bolt hole 19. The slot 15 extends to a point adjacent the second end of saddle element 21. Second saddle element 10 includes a bolt hole 16 and a slot 14 in its outer edge 22 having dimensions and placement identical to those of first saddle element 12. It is to be noted that bolt holes 19 and 16 are at ends of the respective saddle elements 12 and 10 having extensions 17 and 15.

FIG. 3 shows a threaded metal rod 20 having a diameter selected to match the diameter of bolt holes 16 and 19. As will be described below, rod 20 is adapted for use in the U-bolt clamp of the invention. Rod 20 may be threaded stock available in various lengths. One standard length of threaded stock 20 can be used for a range of different size pipes. After being installed as discussed hereinbelow, any excess length can be cut off.

In FIG. 4, a typical post 26, or other cylindrical structure, is shown having a U-bolt saddle clamp 30 of the invention is shown. To install clamp 30, a threaded rod 2-0 is centered along the post 26 and bent around the post to form a U-bolt 20A. Next, saddle element 12 is inserted into saddle element 10 as indicated by arrow C of FIG. 1 to form saddle assembly 29. The relative positions of saddle elements 10 and 12 are adjusted so that bolt holes 16 and 19 match the legs of U-bolt 20A. Washers 25, lock washers 27 and nuts 28 are installed on U-bolt 20A, and tightened. This action causes the tooth-like portions of arcuate edges 11 and 13 bite into the surface of pole 26, thereby securely attaching clamp 30 thereto. The portions of threaded U-bolt 20A in contact with post 26 also grip the pole surface, providing a more secure clamp than a partially threaded U-bolt.

The projecting ends of U-bolt 20A are available for mounting any desired devices to post 26. Any excess bolt length may be suitably trimmed after such mounting.

As will be recognized, a U-bolt can be produced for posts 26 having a range of diameters. The diameter range limits for the exemplary embodiment of the disclosure are indicated in FIG. 2. The maximum diameter that can be accommodated is shown by arrow E, and the minimum diameter is shown by arrow D. Sets of saddle assemblies 29 with matching diameters of threaded rod 20 may be provided for the maximum and minimum post diameters desired.

As will now be recognized, the invention is an adjustable U-bolt clamp having a threaded rod formed to provide a U-bolt by bending the rod around a selected post. The clamp has an adjustable saddle having first and second saddle elements wherein the first and second saddle elements are slidably engaged. The saddle has post gripping surfaces. The first and second saddle elements each has a bolt hole for insertion of a first leg of the U-bolt and a slot for insertion of a second leg of the U-bolt. Nuts and washers are provided for securing said U-bolt and the first and second saddle elements in clamping contact with the selected post.

As may now be understood, the invention provides a simple, low cost U-bolt type clamp that can be utilized to attach items to posts, pipes and the like wherein one clamp can be utilized with a range of pipe sizes. Although a specific structure has been disclosed, various modifications can be made thereto without departing from the spirit and scope of the invention.

I claim:

1. An adjustable U-bolt clamp comprising:
   a) a threaded rod formed to provide a U-bolt by bending said rod around a selected post;
   b) an adjustable saddle having first and second saddle elements wherein said first and second saddle elements are slidably engaged, said saddle having post gripping surfaces, said first and second saddle elements each having a bolt hole for insertion of a first leg of said U-bolt and a slot for insertion of a second leg of said U-bolt; and
   c) means for securing said U-bolt and said first and second saddle elements in clamping contact with the selected post.

2. The clamp as defined in claim 1 in which said means for securing said U-bolt is a set of nuts and washers.

3. The clamp as defined in claim 1 in which said first and second saddle elements are in the form of channels wherein a first of said elements is slidably disposed in the second one of said saddle elements.

4. The clamp as defined in claim 3 in which said channels include arcuate extensions for providing clamping contact with the selected post.

5. An adjustable clamp for posts, pipes, and the like comprising:
   a) a clamp saddle having a pair of complementary saddle elements, each of said elements including arcuate clamping surfaces for contacting a post wherein said saddle elements are slidably engaged;
   b) each of said saddle elements having a channel portion including a closed edge, each of said closed edges having a bolt hold therethrough and a slot therethrough in which said engaged saddle elements have the bolt hole of each of said elements aligned with the slot of its opposing element;
   c) a threaded bar bendable to selectively form a U-bolt whereby a first leg of said U-bolt is insertable through the bolt hole of a first of said saddle elements and the slot of the second of said saddle elements, and a second leg of said U-bolt insertable through the bolt hole of the second of said saddle elements and the slot of said first of said saddle elements; and
   d) fastening means for securing said clamp when installed on a pipe or the like to maintaining said arcuate clamping surfaces in gripping contact with the pipe.

* * * * *